United States Patent
Shibata et al.

(10) Patent No.: US 10,963,548 B2
(45) Date of Patent: Mar. 30, 2021

(54) INFORMATION ACQUISITION DEVICE, INFORMATION ACQUISITION SYSTEM, AND INFORMATION ACQUISITION METHOD

(71) Applicant: OLYMPUS CORPORATION, Hachioji (JP)

(72) Inventors: Yutaka Shibata, Hachioji (JP); Kazutaka Tanaka, Hachioji (JP); Yuichi Ito, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 219 days.

(21) Appl. No.: 16/156,662

(22) Filed: Oct. 10, 2018

(65) Prior Publication Data

US 2019/0114405 A1 Apr. 18, 2019

(30) Foreign Application Priority Data

Oct. 12, 2017 (JP) .............................. JP2017-198480

(51) Int. Cl.
*G06F 21/32* (2013.01)
*G06F 21/34* (2013.01)
*G06F 21/45* (2013.01)

(52) U.S. Cl.
CPC .............. *G06F 21/32* (2013.01); *G06F 21/34* (2013.01); *G06F 21/45* (2013.01)

(58) Field of Classification Search
CPC ........... G06F 21/32; G06F 21/34; G06F 21/45
See application file for complete search history.

(56) References Cited

U.S. PATENT DOCUMENTS

| 9,047,454 | B2 * | 6/2015 | Ochi | ....................... G06F 21/32 |
| 9,491,033 | B1 * | 11/2016 | Soyannwo | ............ H04W 4/026 |
| 10,083,693 | B2 * | 9/2018 | Jaiswal | ............... H04M 3/4936 |
| 2019/0018624 | A1 * | 1/2019 | Naruse | .................. G06F 3/1294 |

FOREIGN PATENT DOCUMENTS

JP 2010081442 A 4/2010

* cited by examiner

*Primary Examiner* — Daniel B Potratz
*Assistant Examiner* — Wansik You
(74) *Attorney, Agent, or Firm* — Volpe Koenig

(57) ABSTRACT

An information acquisition device and method. The information acquisition device includes a first control circuitry. The first control circuitry is configured to acquire user information including a user's voiceprint, and a user name indicated by the user's voiceprint, based on an authentication audio data acquired in a state where functions related to an information acquisition are restricted, execute a user authentication to cancel the restrictions on the information acquisition when the user's voiceprint agrees with a registered user's voiceprint which is a voiceprint of a preliminarily registered user, and the user name agrees with a registered user name indicated by the registered user's voiceprint, perform the information acquisition after the user authentication is executed, and generate an authenticated data so that the information acquired by the information acquisition is associated with the user name.

18 Claims, 11 Drawing Sheets

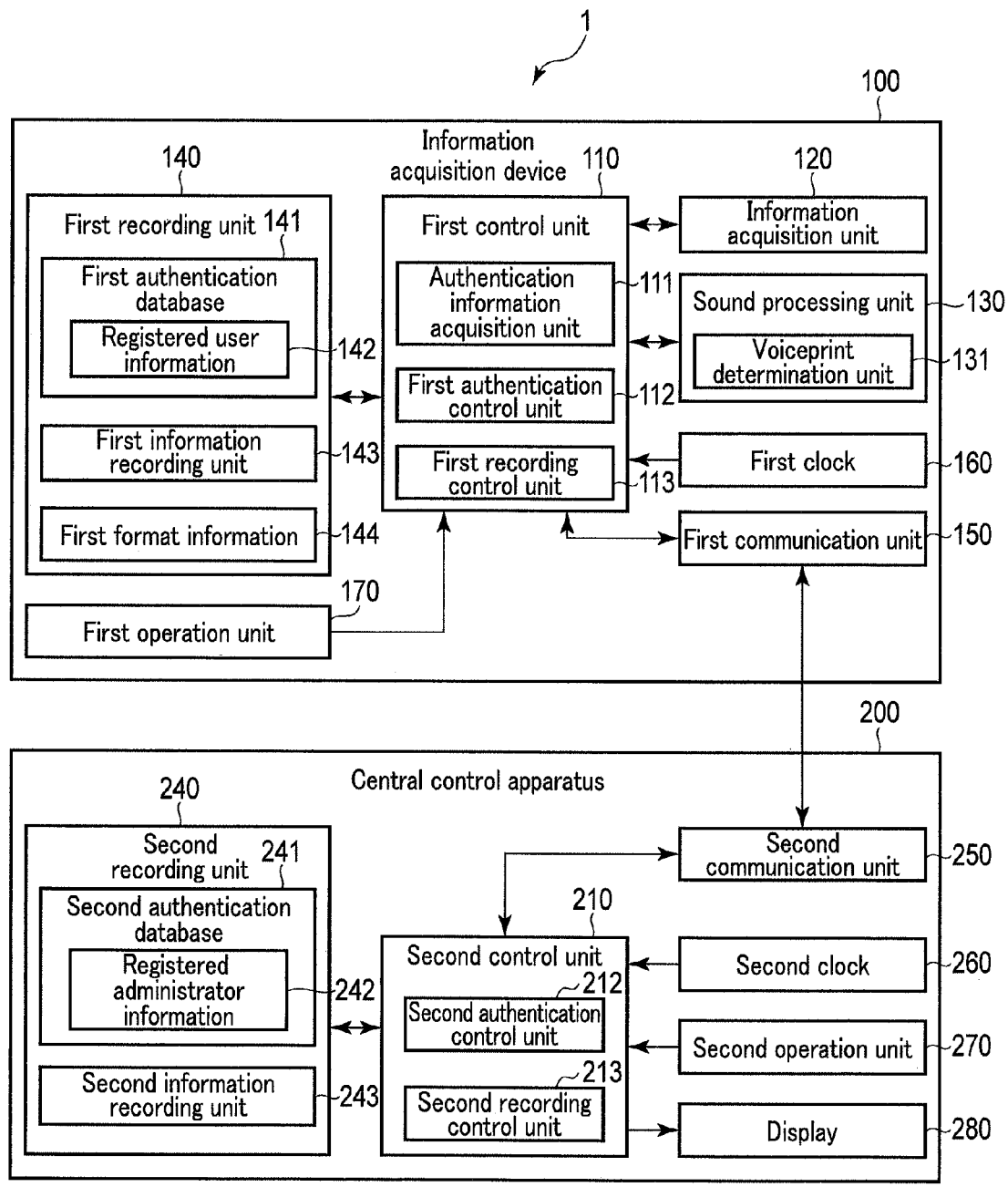
F I G. 3

INFORMATION ACQUISITION DEVICE, INFORMATION ACQUISITION SYSTEM, AND INFORMATION ACQUISITION METHOD

CROSS-REFERENCE TO RELATED APPLICATIONS

This application is based upon and claiming the benefit of priority from prior Japanese Patent Application No. 2017-198480, filed Oct. 12, 2017, the entire contents of which are incorporated herein by reference.

BACKGROUND OF THE INVENTION

1. Field of the Invention

The present invention relates to an information acquisition device, an information acquisition system, and an information acquisition method.

2. Description of the Related Art

A technique of performing user authentication and enabling a function that is restricted for registered users is already known. For example, Jpn. Pat. Appln. KOKAI Publication No. 2010-81442 discloses a technique concerning a door phone device which allows audio communications between a visitor and a responder, when authentication information input by the visitor agrees with authentication information registered in a reserved information database. The capability of identifying a user who uses a device by authentication is in demand from the viewpoint of security. In sound authentication which is authentication using sound, a user can easily receive authentication without touching to operate a device. For the reasons described above, a technique concerning an information device that can be used by only a user who has been approved by sound authentication is in demand.

BRIEF SUMMARY OF THE INVENTION

According to an aspect of the invention, an information acquisition device includes a first control circuitry. The first control circuitry is configured to acquire a user information including a user's voiceprint which is a voiceprint of a user, and a user name indicated by the user's voiceprint, based on an authentication audio data acquired in a state where functions related to an information acquisition are restricted, execute a user authentication to cancel the restrictions on the information acquisition when the user's voiceprint agrees with a registered user's voiceprint which is a voiceprint of a preliminarily registered user, and the user name agrees with a registered user name indicated by the registered user's voiceprint, perform the information acquisition after the user authentication is executed, and generate an authenticated data so that the information acquired by the information acquisition is associated with the user name.

According to an aspect of the invention, an information acquisition system includes the information acquisition device and a central control apparatus. The central control apparatus includes a second recording circuit, a second communication device, and a second control circuitry. In the second recording circuit, a second authentication database is recorded. The second authentication database includes the registered administrator's voiceprint and the registered approval phrase. The second communication device is configured to communicate with the information acquisition device. The second control circuitry is configured to issue the approval notice when the administrator's voiceprint agrees with the registered administrator's voiceprint, and the approval phrase agrees with the registered approval phrase.

According to an aspect of the invention, an information acquisition method includes executing user authentication in a state where information acquisition is restricted, performing the information acquisition after the user authentication is approved, and generating authenticated data so that information acquired in the information acquisition is associated with the user name. The user authentication includes acquiring authentication audio data, acquiring user information including a user's voiceprint which is a voiceprint of a user, and a user name indicated by the user's voiceprint, based on the authentication audio data, acquiring registered user information including a registered user's voiceprint which is a voiceprint of a preliminarily registered user, and a registered user name indicated by the registered user's voiceprint, making a first determination to determine whether or not the user's voiceprint agrees with the registered user's voiceprint, and the user name agrees with the registered user name, and cancelling restrictions on a function related to the information acquisition when it is determined in the first determination that the user information agrees with the registered user information.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram showing the outline of a configuration example of an information acquisition system according to the first embodiment.

DETAILED DESCRIPTION OF THE INVENTION

First Embodiment

<Outline>

Figure 1:
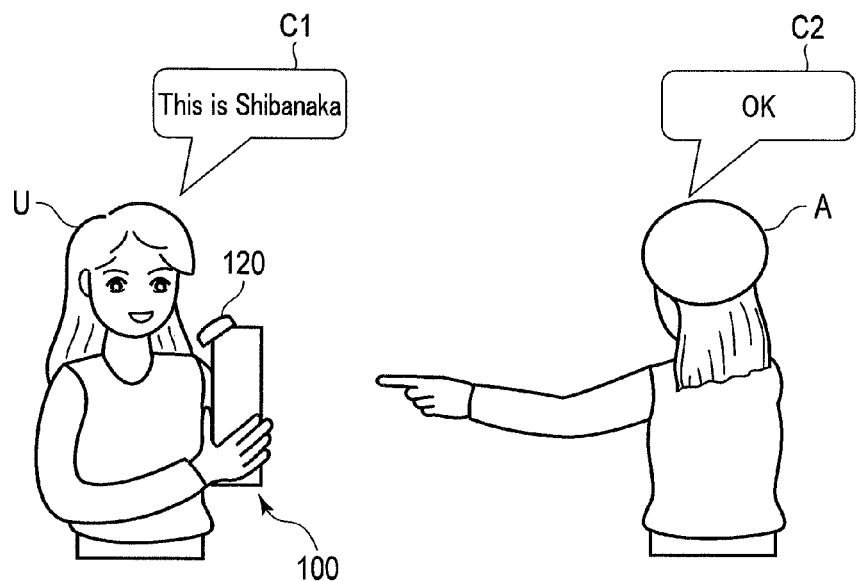
FIG. 1 is a schematic diagram for illustrating one example of initial authentication according to a first embodiment.
Figure 2:
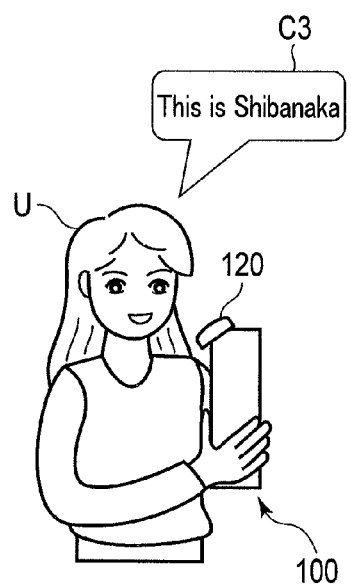
FIG. 2 is a schematic diagram for illustrating one example of user authentication according to the first embodiment.

A first embodiment of the present invention will be described with reference to the drawings. FIG. 1 is a schematic diagram for illustrating one example of initial authentication according to the present embodiment. FIG. 2 is a schematic diagram for illustrating one example of user authentication according to the present embodiment. The initial authentication according to the present embodiment is authentication performed for user registration in which a user is registered as a user of an information acquisition device 100. The user authentication according to the present embodiment is authentication for authorizing a registered user such as a user U to execute information acquisition. Hereinafter, the outline of an information acquisition method according to the present embodiment will be described with reference to FIGS. 1 and 2. FIGS. 1 and 2 show an appearance where the information acquisition device 100 according to the present embodiment is used to perform initial authentication or user authentication.

In the information acquisition method according to the present embodiment, information on a user U (Prover) approved by an administrator A (Verifier) is registered as registered user information in initial authentication as shown in FIG. 1. The user U (Prover) can start information acquisition using the information acquisition device 100 after being approved in user authentication as shown in FIG. 2. Information acquired in the information acquisition is associated with related information (auxiliary information), and thereby authenticated data is generated.

The user U (Prover of the initial authentication), who hopes for user registration, utters a vocal sound of an initial authentication user's voice C1, which is a sound including a user name he or she would like to register. The initial authentication user's voice C1 is, for example, a sound like "This is Shibanaka", when the user name the user would like to register is "Shibanaka". If the administrator A intends to approve the user registration of the user U, the administrator A utters an approver's voice C2 which is a sound including an approval phrase indicating an approval, after the user U uttered the initial authentication user's voice C1. If the approval phrase is "OK", the approver's voice C2 is, for example, a sound like "OK". The initial authentication user's voice C1 and the approver's voice C2 are acquired as authentication audio data (initial authentication audio data). The acquired authentication audio data is subjected to sound processing. In the sound processing, user information including a user name and a user's voiceprint which is a voiceprint of the user U, and administrator information including an approval phrase and an administrator's voice-print which is a voiceprint of the administrator A is acquired. The user's voiceprint is a voiceprint of the user U when the user U has uttered a sound of the user name. The administrator's voiceprint is a voiceprint of the administrator A when the administrator A has uttered a sound of the approval phrase. The acquired administrator information is compared with information on a registered administrator who is a preliminarily registered administrator (registered administration information) (First determination). The registered administrator information includes a registered approval phrase and a registered administrator's voiceprint which is a voiceprint of the registered administrator. The registered administrator's voiceprint is a voiceprint of the registered administrator when the registered administrator has uttered the sound of the registered approval phrase. In the first determination, when the administrator's voiceprint agrees with the registered administrator's voiceprint, and the approval phrase agrees with the registered approval phrase, the administrator A is determined to be a registered administrator who is authorized to approve user registration in the initial authentication. At this time, this means that the user U has been approved in the initial authentication. The user information approved in the initial authentication is registered as registered user information. The registered user information includes a registered user's voiceprint and a registered user name. The registered user's voiceprint is a voiceprint of sound indicating the registered user name. The thus registered user U can bring out the information acquisition device 100 from a location where the initial authentication was performed and acquire information singularly by using the information acquisition device 100.

The user U (Prover of the user authentication) who wishes to execute information acquisition utters a sound of a user authentication user's voice C3, which is a sound including the registered user name that has been registered in the initial authentication. If the registered user name is "Shibanaka", the user authentication user's voice C3 is, for example, a sound like "This is Shibanaka" The user authentication user's voice C3 is acquired as authentication audio data (user authentication audio data). The acquired authentication audio data is subjected to sound processing. In the sound processing, user information including a user name and a user's voiceprint which is a voiceprint of the user U is acquired. Whether or not the acquired user information agrees with the registered user information is determined (Second determination). In the second determination, when the user's voiceprint agrees with the registered user's voiceprint, and the user name agrees with the registered user name, the user U is determined to be a registered user who is authorized to execute information acquisition. At this time, this means that the user U has been approved in the user authentication. In this way, the user U can start information acquisition after being approved in the user authentication. Information acquired by the information acquisition method according to the present embodiment after the user authentication may be sound, a still image, a moving image, text data in which sound is transcribed into characters, or a measurement value obtained, for example, by a sensor. That is, the information acquisition device 100 according to the present embodiment is an electronic device having an information acquisition function, for example, a voice recorder, digital camera, PC, smartphone, inspection device, etc.

Authenticated data acquired after the approval is generated based on acquired data, such as image data, audio data, text data, measurement data, etc., and auxiliary data generated based on related information. The related information includes information related to the user U who has been approved in the user authentication, information related to the administrator A who has approved the user U in the initial authentication (approver information), and information related to the information acquisition circumstances, such as a location where the information was acquired, and time and date when the information was acquired, etc. In this way, the information (authenticated data) acquired using the information acquisition method according to the present embodiment may become information with high evidentiality, which means it is clear when and from whom the information was acquired.

<Configuration>

Hereinafter, the information acquisition method according to the present embodiment will be described in more detail, using, as an example, a case where the information acquisition device 100 according to the present embodiment is a voice recorder, and the information to be acquired after the user authentication is audio data. The outline of an information acquisition system 1 according to the present embodiment is shown, in FIG. 3, as a block diagram. As shown in FIG. 3, the information acquisition system 1 according to the present embodiment includes an information acquisition device 100 and a central control apparatus 200.

The information acquisition device 100 according to the present embodiment is, as described above, an information acquisition device in which the restrictions on the information acquisition function are canceled and becomes in a usable state after a user is approved in the user authentication using sound authentication. The information acquisition device 100 includes a first control unit 110, an information acquisition unit 120, a sound processing unit 130, a first recording unit 140, a first communication unit 150, a first clock 160, and a first operation unit 170.

The first control unit 110 controls operations of respective units of the information acquisition device 100. The first control unit 110 is one example of a first control circuitry. The first control unit 110 has functions as an authentication information acquisition unit 111, a first authentication control unit 112, and a first recording control unit 113. The authentication information acquisition unit 111 acquires various types of information used in the initial authentication and user authentication. The authentication information acquisition unit 111 acquires authentication audio data (initial authentication audio data and user authentication audio data) from the information acquisition unit 120. The authentication information acquisition unit 111 acquires user information and administrator information, based on the authentication audio data after being subjected to sound processing output by the sound processing unit 130. The authentication information acquisition unit 111 acquires, in the initial authentication, an approval notice output by the central control apparatus 200. The authentication information acquisition unit 111 acquires various types of information included in related information. The first authentication control unit 112 restricts functions related to information acquisition of the information acquisition device 100 when the user authentication is in a non-approved state, and the first authentication control unit 112 cancels the restrictions when the user authentication is approved. The first authentication control unit 112 has a function as an initial authentication control unit on the device 100 which controls operations of the information acquisition device 100 in the initial authentication, and a function as a user authentication control unit which controls the user authentication. The initial authentication control unit on the device 100 transmits administrator information to the central control apparatus 200. The initial authentication unit on the device 100 determines that user registration is approved when an approval notice output by the central control apparatus 200 is acquired via the first communication unit 150. The user authentication control unit refers to the first recording unit 140 and acquires registered user information 142. The user authentication control unit determines whether or not the user information acquired by the authentication information acquisition unit 111 agrees with the registered user information 142. The first recording control unit 113 records, in the first recording unit 140, the user information as registered user information 142, based on output of the first authentication control unit 112. The first recording control unit 113 associates the information acquired after the user authentication with related information and records, in the first recording unit 140, the information associated with the related information, as authenticated data.

The information acquisition unit 120 acquires various types of information. The various types of information include audio data (authentication audio data) for use in the initial authentication or user authentication, and information (audio data) acquired in the information acquisition executed after approval of the user authentication. The information acquisition unit 120 may include a microphone that collects sound to acquire audio data, or may acquire audio data from an external microphone, etc., provided outside the information acquisition device 100.

The sound processing unit 130 subjects audio data to various types of sound processing including noise removal. The sound processing unit 130 extracts a user name and an approval phrase from the authentication audio data. The sound processing unit 130 includes a voiceprint determination unit 131. The voiceprint determination unit 131 acquires a user's voiceprint and an administrator's voiceprint, based on the authentication audio data. The voiceprint determination unit 131 compares the user's voiceprint with a registered user's voiceprint and outputs a comparison result to the first authentication control unit 112.

The first recording unit 140 includes a first authentication database 141, a first information recording unit 143, and first format information 144. The first recording unit 140 is one example of a first recording circuit. Registered user information 142 is recorded in the first authentication database 141. In the first information recording unit 143, various types of information, such as authentication audio data, acquired data such as audio data, auxiliary data based on related information, and generated authenticated data, etc., acquired at the information acquisition device 100. In the first format information 144, information on data format of auxiliary data, authenticated data, etc., is recorded. In the first recording unit 140, programs and parameters to be used in each of the units of the information acquisition device 100 are recorded. Furthermore, various types of data including processed data during operation of the information acquisition device 100 are temporarily recorded in the first recording unit 140.

The first communication unit 150 communicates with the central control apparatus 200. The first communication unit 150 is one example of a first communication device. In the communications, wireless communications utilizing, for example, Wi-Fi, Bluetooth, Bluetooth Low Energy (BLE), etc., are used. The information acquisition device 100 and the central control apparatus 200 may be connected by wire to communicate with each other, or may be connected to a telecommunication line such as the Internet to communicate with each other via the telecommunication line such as the Internet. Data transfer between the information acquisition device 100 and the central control apparatus 200 may be performed by a recording medium which is present outside the information acquisition system 1, for example, a USB memory, CD-ROM, a data server over the network, etc.

The first clock 160 generates information on data and time and outputs the information to the first control unit 110.

The first operation unit 170 acquires user operations. The first operation unit 170 may be an element capable of acquiring user operations, and includes, for example, a touch panel, a press button, a knob, a slider, a dial, a lever, a keyboard, etc.

The central control apparatus 200 according to the present embodiment is an external apparatus which manages various types of information related to the information acquisition system 1 and executes processing related to the initial authentication in cooperation with the information acquisition device 100. The central control apparatus 200 according to the present embodiment is an information apparatus, for example, a PC, a server, etc. The central control apparatus 200 includes a second control unit 210, a second recording unit 240, a second communication unit 250, a second clock 260, a second operation unit 270, and a display 280.

The second control unit 210 controls operations of respective units of the central control apparatus 200. The second control unit 210 is one example of a second control circuitry. The second control unit 210 has functions as a display control unit that generates display information on the display 280, a second authentication control unit 212, and a second recording control unit 213. The second authentication control unit 212 has a function as an initial authentication control unit on the administrator which controls operations of the central control apparatus 200 in the initial authentication, and a function as an administrator registration control unit that controls settings of registered administrator information 242. The initial authentication control unit on the administrator acquires administrator information transmitted from the information acquisition device 100. The initial authentication control unit on the administrator refers to the second recording unit 240 and acquires registered administrator information 242. The initial authentication control unit on the administrator determines whether or not the administrator information acquired via communications agrees with registered administrator information 242, and determines that the initial authentication is approved when it is determined that the administrator information agrees with the registered administrator information 242. The initial authentication control unit on the administrator generates (issues) an approval notice when it is determined that the initial authentication is approved. If it is not determined that the initial authentication is approved, a non-approval notice may be generated. The initial authentication control unit on the administrator transmits the approval notice to the information acquisition device 100. The second recording control unit 213 records, in a second authentication database 241, as registered administrator information 242, the administrator information acquired from the information acquisition device 100 via the communication, based on output of the second authentication control unit 212. The second recording control unit 213 records, in the second recording unit 240, authenticated data acquired from the information acquisition device 100.

The second recording unit 240 includes the second authentication database 241 and a second information recording unit 243. The second recording unit 240 is one example of a second recording circuit. Registered administrator information 242 is recorded in the second authentication database 241. In the second information recording unit 243, various types of information, such as audio data, authentication data, etc., received from the information acquisition device 100 are recorded. Furthermore, various types of data including audio data, an extracted approval phrase, an administrator's voiceprint, and processing data during operation are temporarily recorded in the second recording unit 240. In the second recording unit 240, programs, and parameters, etc., for use in each of units of the central control apparatus 200 are recorded.

The second communication unit 250 communicates with the information acquisition device 100. The second communication unit 250 is one example of a second communication device. The second communication unit 250 transmits an approval notice to the information acquisition device 100 in accordance with a result of the initial authentication.

The second clock 260 generates information on data and time and outputs the information to the second control unit 210. The information on date and time is used in preparation of authenticated data, etc.

The second operation unit 270 acquires user operations. The second operation unit 270 may be a component capable of acquiring user operations, and includes, for example, a touch panel, a press button, a knob, a slider, a dial, a lever, a keyboard, etc.

The display 280 displays display information generated from the second control unit 210. The display 280 is, for example, a liquid crystal display. The display 280 may be an organic light emitting display, a projector that projects display information outside, or an interface connected to an external display.

Each of the first control unit 110, the sound processing unit 130, and the second control unit 210 includes an integrated circuit, such as a Central Processing Unit (CPU), an Application Specific Integrated Circuit (ASIC), or a Field Programmable Gate Array (FPGA), etc. Each of the first control unit 110, the sound processing unit 130, and the second control unit 210 may consist of one integrated circuit, etc., or a plurality of integrated circuits in combination. The operations of these integrated circuits are performed in accordance with programs recorded, for example, in the first recording unit 140, or the second recording unit 240, or recording regions in the integrated circuits.

The first recording unit 140 and the second recording unit 240 are nonvolatile memories, such as a flash memory. The first recording unit 140 and the second recording unit 240 may further include a volatile memory, such as a Static Random Access Memory (SRAM) and a Dynamic Random Access Memory (DRAM). Each of the first recording unit 140 and the second recording unit 240 may consist of one memory, etc., or a plurality of memories in combination. Furthermore, the first recording unit 140 and the second recording unit 240 may utilize, as part of the memories, data or a server, etc., which are present outside.

<Operations>

Figure 4:
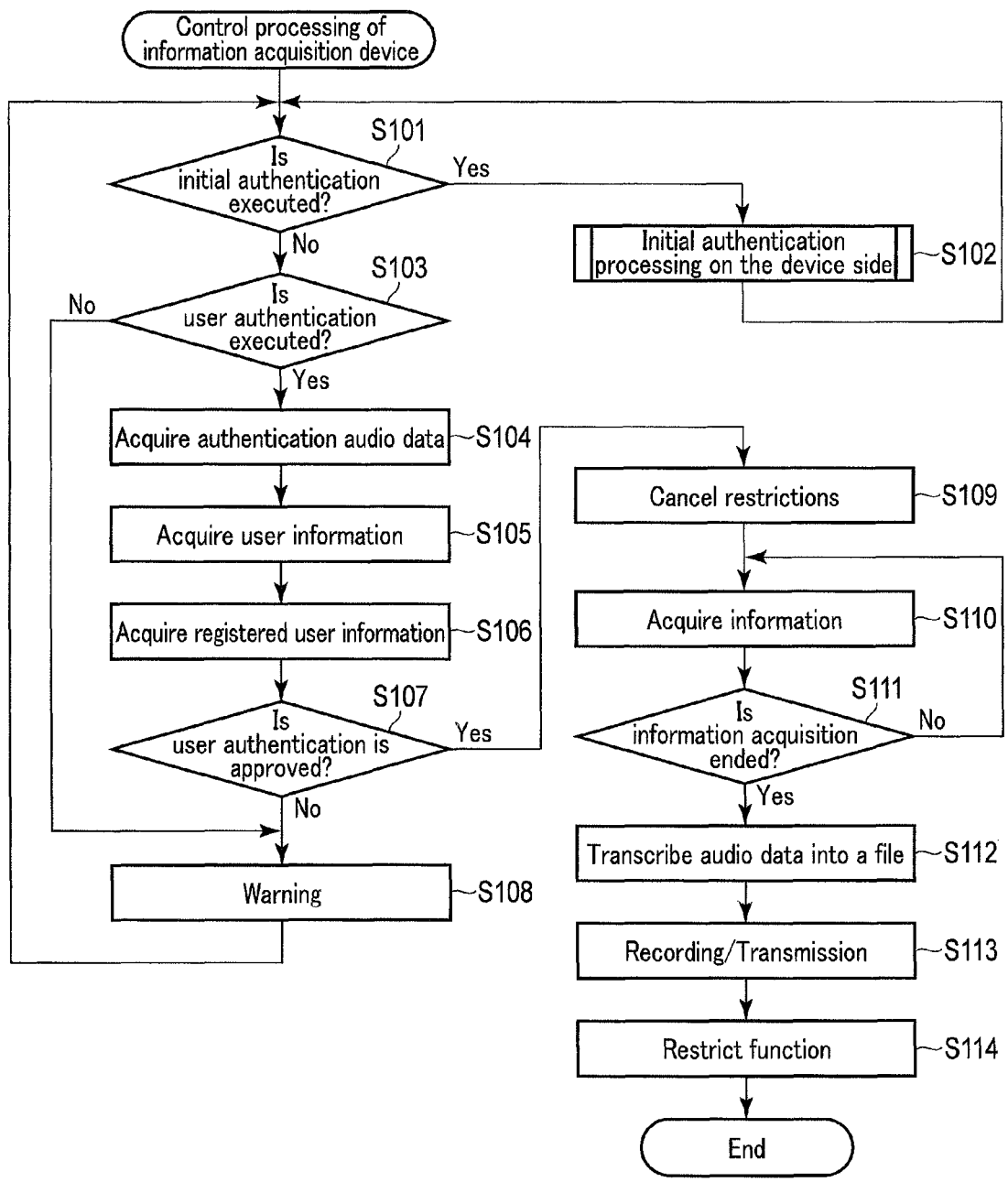
FIG. 4 is a flowchart showing one example of the control processing of an information acquisition device according to the first embodiment.

Here, one example of the control processing of the information acquisition device according to the present embodiment is shown in FIG. 4 as a flowchart, and operations of the information acquisition system 1 will be described with reference to the flowchart.

In step S101, the first control unit 110 determines whether to execute the initial authentication. This determination is made based, for example, on the output of the first operation unit 170 according to a user operation. When it is determined that the initial authentication is executed, the processing proceeds to step S102, and when it is not determined as such, the processing proceeds to step S103. In the determination on whether to execute the initial authentication, it may be determined that the initial authentication will be executed also in the case where the initial authentication has not been executed yet, where no registered user information 142 is present, or authentication audio data for initial authentication (initial authentication audio data) is acquired, etc. A validity period may be provided for registered user information 142, and whether to execute the initial authentication may be determined depending on whether or not effective registered user information 142 is present within the validity period. In step S102, the first control unit 110 executes the initial authentication processing on the device 100 which is processing in the initial authentication on the information acquisition device 100 side. The details of the initial authentication processing on the device 100 will be described later. After the initial authentication processing on the device 100 ends, the processing returns to step S101.

In step S103, the first control unit 110 determines whether to execute the user authentication. This determination is made based, for example, on output of the first operation unit 170 according to a user's operation. When it is determined that the user authentication is executed, the processing proceeds to step S104, and when it is not determined as such, the processing proceeds to step S108. In the determination on whether to execute the user authentication, it may be determined that the user authentication will be executed also in the case where the user authentication has not been executed yet and the information acquisition function is restricted, or in the case where authentication audio data for user authentication (user authentication audio data) is acquired, etc. A valid period may be set in which the restrictions on the information acquisition function are canceled after the user authentication, and whether to execute the user authentication may be determined depending on whether or not a predetermined time corresponding to the valid period has elapsed since the approval of the previous user authentication.

In step S104, the authentication information acquisition unit ill acquires authentication audio data (user authentication audio data). The authentication audio data may be acquired by collecting sounds with a microphone provided in the information acquisition unit 120, may be acquired from the outside (external device) via the first communication unit 150. In step S105, the first authentication control unit 112 outputs the authentication audio data acquired in step S104 to the sound processing unit 130 and causes the sound processing unit 130 to analyze the authentication audio data. The sound processing unit 130 analyzes the authentication audio data to extract a voiceprint of the user (user's voiceprint) and a user name indicated by the user's voiceprint. The authentication information acquisition unit 111 acquires, as user information, the extracted user's voiceprint and user name. There may be a case where the authentication audio data is analyzed outside (external device) the information acquisition device 100 and the user's voiceprint and the user name are acquired. In this case, in step S104 and step S105, the authentication information acquisition unit 111 acquires the user's voiceprint and the user name via the first communication unit 150. In step S106, the authentication information acquisition unit 111 acquires registered user information 142 from the first authentication database 141. The registered user information 142 includes the user name (registered user name) of the user who was approved in the initial authentication, and the voiceprint (registered user's voiceprint) when the user uttered a sound of the registered user name.

In step S107, the first authentication control unit 112 determines whether to approve the user authentication. The first authentication control unit 112 determines whether or not the user's voiceprint agrees with the registered user's voiceprint in accordance with output from a voiceprint determination unit 131 provided in the sound processing unit 130. The first authentication control unit 112 determines whether or not the user name agrees with the registered user name. The first authentication control unit 112 determines that the user authentication is approved when the user's voiceprint agrees with the registered user's voiceprint and a first user name agrees with the registered user name. When it is determined that the user authentication is approved, the processing proceeds to step S109, and when it is not determined as such, the processing proceeds to step S108.

In step S108, the first control unit 110 gives the user a warning that the information acquisition function is in an unavailable state. If it is after the user authentication is not determined in step S103, the first control unit 110 further gives the user a warning that initial authentication or user authentication is required. If it is not determined in step S107 that the user authentication is approved, the first control unit 110 further gives the user a warning that the user authentication is not approved. Thereafter, the processing returns to step S101. The warning to the user may be conducted by replaying preliminarily set audio data, etc., or if the information acquisition device 100 includes a display, the warning may be given by display, or if the information acquisition device 100 includes a vibration unit including actuator, the warning may be given by vibrations.

In step S109, the first authentication control unit 112 cancels the restrictions on the information acquisition function to set the information acquisition device 100 to be in such a state that information can be acquired. In step S110, the first control unit 110 starts information acquisition. Since the information acquisition device 100 according to the present embodiment is a voice recorder, in this step, the first control unit 110 causes the information acquisition unit 120 to acquire sound of a sound collection target. In step S111, the first control unit 110 determines whether to end the information acquisition. This determination is made based, for example, on output of the first operation unit 170 according to a user's operation. When it is determined that the information acquisition is not ended, the processing returns to step S110. The processing of step S110 and step S111 is repeated until it is determined in step S110 that the information acquisition is ended. When it is determined that the information acquisition is ended, the processing proceeds to step S112.

Figure 5:
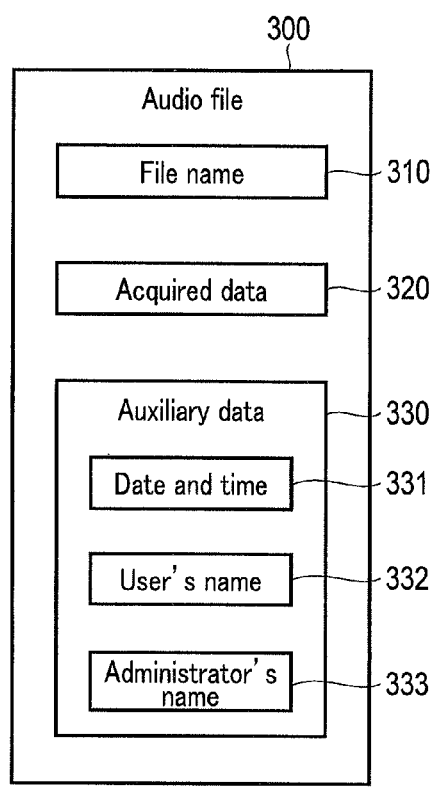
FIG. 5 is a block diagram showing the outline of an audio file according to the first embodiment.

In step S112, the first recording control unit 113 generates a file of the acquired audio data (generation of authenticated data). The first recording control unit 113 refers to first format information 144 recorded in the first recording unit 140 to generate the file (generation of authenticated data). Here, one example of the structure of an audio file (authenticated data) to be generated in this step is shown in FIG. 5. As shown in FIG. 5, audio file 300 includes a file name 310, acquired data 320, and auxiliary data 330. The auxiliary data 330 includes items of date and time 331 when acquired data 320 was acquired, a user name of a user approved in user authentication, and an administrator name 333 who approved the registration of the user in initial authentication. In step S113, the first recording control unit 113 records generated audio file (authenticated data) in the first information recording unit 143 or transmits the audio file to the outside of the information acquisition device 100 (external device), such as the central control apparatus 200, etc., via the first communication unit 150. In step S114, the first control unit 110 restricts the information acquisition function provided in the information acquisition device 100. Thereafter, the processing ends.

Figure 6:
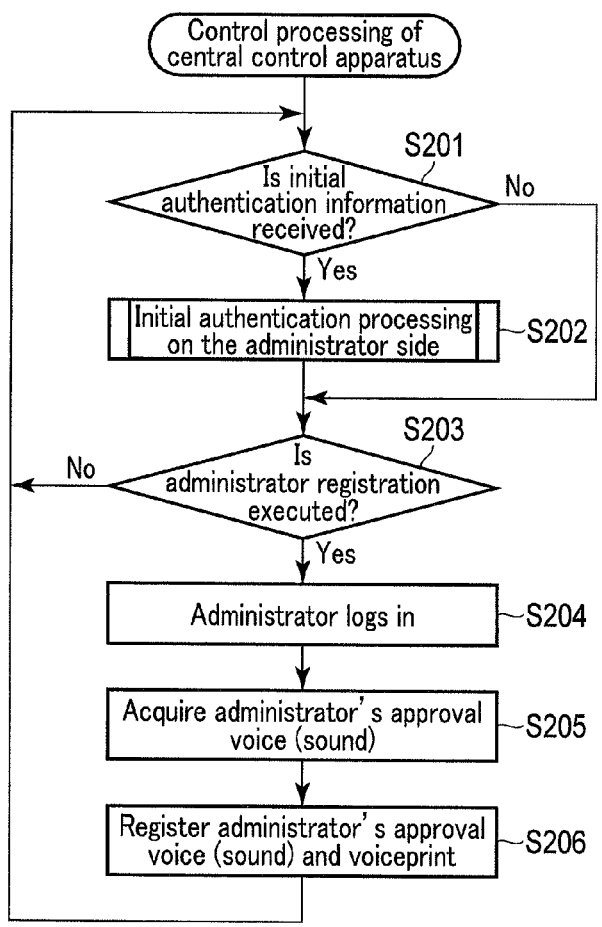
FIG. 6 is a flowchart showing one example of the control processing of a central control apparatus according to the first embodiment.

Here, one example of the control processing of a central control apparatus executed by the central control apparatus 200 is shown in FIG. 6 as a flowchart, and operations of an information acquisition system 1 will be described with reference to the flowchart.

In step S201, a second control unit 210 determines whether or not initial authentication information is received from the information acquisition device 100. The initial authentication information is information transmitted from the information acquisition device 100 in the initial authentication processing on the device 100. When it is determined that the initial authentication information is received, the processing proceeds to step S202, and when it is not determined as such, the processing proceeds to step S203. In step S202, the second control unit 210 executes the initial authentication processing on the administrator which is processing in the initial authentication on the central control apparatus 200 side. The details of the initial authentication processing on the administrator will be described later. After the end of the initial authentication processing on the administrator, the processing proceeds to step S203.

In step S203, the second control unit 210 determines whether to perform administrator registration. This determination is made based, for example, on output of a second operation unit 270 according to a user's operation. When it is determined that the administrator registration is performed, the processing proceeds to step S204, and when it is not determined that the administrator registration is performed, the processing proceeds to step S201. In step S204, the second control unit 210 performs processing concerning administrator-login (administrator registration). The second control unit 210 generates display information for the administrator-login and displays the information on the display 280. The user operates the second operation unit 270 while viewing the display on the display 280, and logs in, as an administrator, to the system. In step S205, the second control unit 210 acquires the administrator's approval sound (registered administrator's sound). In step S206, the second control unit 210 analyzes the administrator's approval sound and acquires a voiceprint indicating the approval sound as a registered administrator's voiceprint. A second recording control unit 213 records, as registered administrator information 242, the registered approval phrase and the registered administrator's voiceprint in a second authentication database 241. The approval sound in the administrator registration may be analyzed by the information acquisition device 100, or by a sound processing circuit which is present outside the information acquisition system 1.

Figure 7:
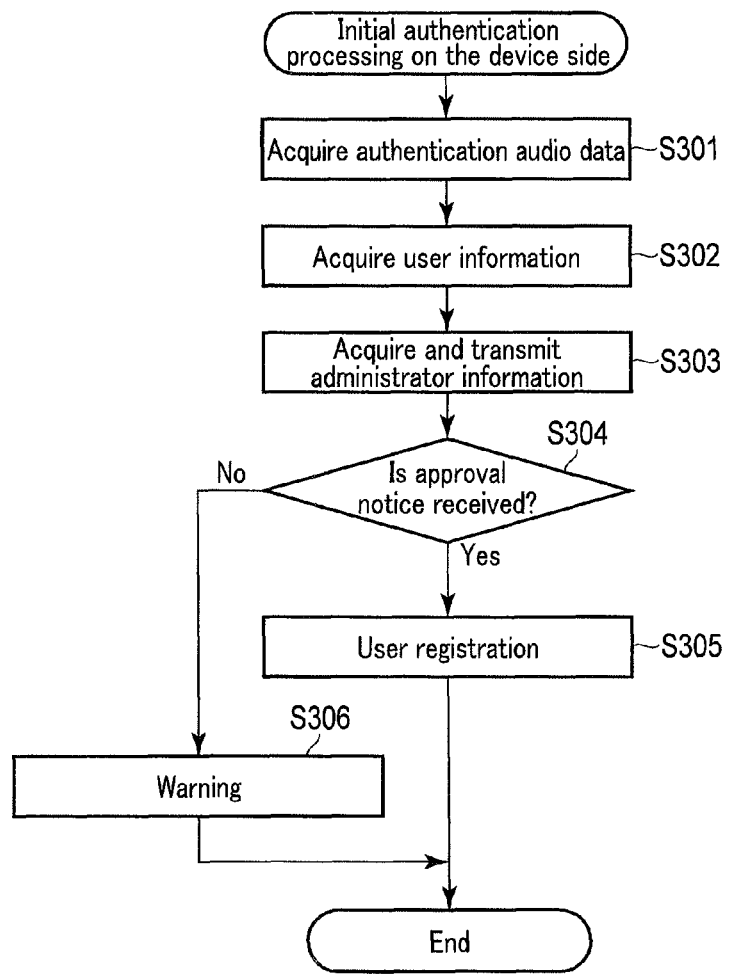
FIG. 7 is a flowchart showing one example of an initial authentication processing on the device executed by the information acquisition device according to the first embodiment.

Here, one example of the initial authentication processing on the device 100 executed by the information acquisition device 100 is shown in FIG. 7 as a flowchart, and operations of the information acquisition system 1 in the initial authentication will be described with reference to the flowchart.

In step S301, the first control unit 110 acquires authentication audio data (initial authentication audio data) from an information acquisition unit 120. In step S302, the first control unit 110 causes the sound processing unit 130 to analyze the acquired authentication audio data. The first control unit 110 acquires user information based on the analysis result. In step S303, the first control unit 110 acquires administrator information in the same manner as step S302. The first control unit 110 transmits, as initial authentication information, the acquired administer information to the central control apparatus 200. In step S304, the first control unit 110 determines whether or not an approval notice is received from the central control apparatus 200. When it is determined that the approval notice is received, the processing proceeds to step S305, and when it is not determined as such, the processing proceeds to step S306. In step S305, the first control unit 110 starts user registration. The first control unit 110 registers, as user registration, a user name (user name to be registered), and a voiceprint when the user has uttered the registered user name (user's voiceprint to be registered). In step S306, the first control unit 110 gives a warning to the user. This warning is made to send a message to the user that the initial authentication is not approved.

Figure 8:
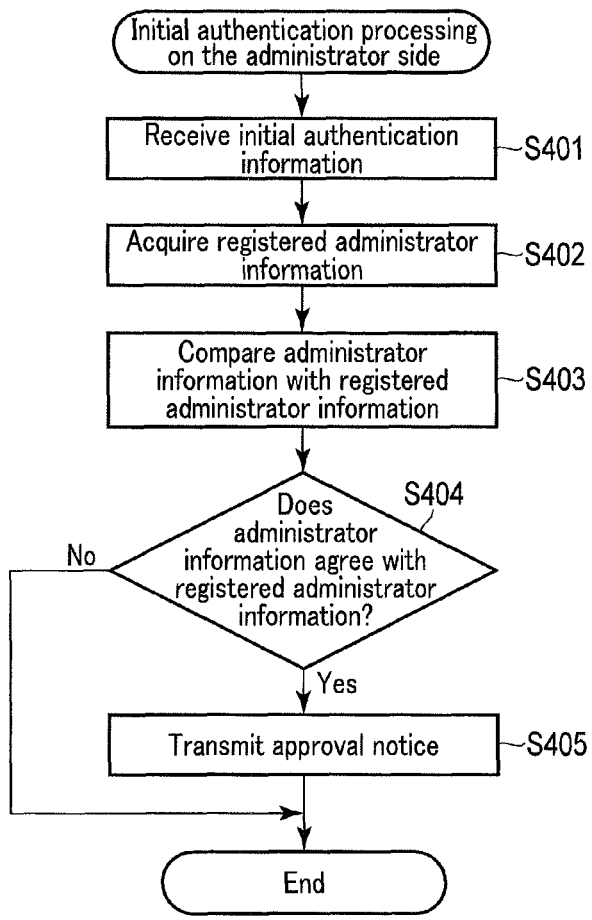
FIG. 8 is a flowchart showing one example of an initial authentication processing on an administrator executed by the central control apparatus according to the first embodiment.

Here, one example of the initial authentication processing on the administrator executed by the central control apparatus 200 is shown in FIG. 8 as a flowchart, and operations of the information acquisition system 1 in the initial authentication will be described with reference to the flowchart.

In step S401, a second control unit 210 acquires initial authentication information (administrator information) via a second communication unit 250. The processing of this step corresponds to the processing of step S303 of the initial authentication processing on the device 100. In step S402, the second control unit 210 acquires registered administrator information 242 from a second authentication database 241. In step S403, the second control unit 210 compares the administrator information with registered administrator information 242. In step S404, the second control unit 210 determines whether or not the administrator information agrees with the registered administrator information 242. When it is determined that the administrator information agrees with the registered administrator information 242, the processing proceeds to step S405, and when it is not determined as such, the processing ends and proceeds to step S203 of the control processing of the central control apparatus. In step S405, the second control unit 210 generates (issues) an approval notice. The second communication unit 250 transmits the approval notice to the information acquisition device 100. If it is not determined that the administrator information agrees with the registered administrator information 242, the second control unit 210 may generate (issue) a non-approval notice. Thereafter, the processing ends, and proceeds to step S203 of the control processing of the central control apparatus 200. The processing of this step corresponds to the processing of step S304 of the initial authentication processing on the device 100.

The information acquisition device 100 according to the present embodiment approves user authentication when input user information agrees with preliminarily registered user information 142 to authorize the user to acquire information. The registered user information 142 is registered in the initial authentication when the administrator information of the administrator who will approve a user agrees with the preliminarily registered administrator information 242. Data acquired after an approval in the user authentication is associated with auxiliary data and is then generated as authenticated data. Therefore, if the user uses the information acquisition device 100 according to the present embodiment, the user can acquire authenticated data with high evidentiality, which clarifies when and from whom the information was acquired merely by uttering the registered user name which has been preliminarily registered. The auxiliary data further includes information concerning the administrator who has approved the user in the initial authentication (approver information). For this reason, it is possible to prevent the user from passing himself off as the administrator and performing user registration, etc.

The information acquisition device 100 according to the present embodiment includes a first authentication database 141 in which registered user information 142 is recorded. According to such a configuration, the information acquisition device 100 can generate authenticated data after the initial authentication, without communicating with the central control apparatus 200. In this process, there is an effect that power consumption caused by communications can be reduced.

The information acquisition device 100 according to the present embodiment communicates with the central control apparatus 200 provided with a second authentication database 241, in which registered administrator information 242 is recorded, to perform initial authentication. The information acquisition device 100 can be used by being taken out, by the user, from the administrator, in information acquisition. The information acquisition device 100 according to the present embodiment does not need to record registered administrator information 242. For this reason, it is useful also from the viewpoint of security to perform initial authentication by utilizing communications with the central control apparatus 200 which includes the second authentication database 241 in which registered administrator information 242 has been recorded.

In the initial authentication or user authentication according to the present embodiment, a voiceprint of a user's voice indicating a user name, a voiceprint of a registered user's voice indicating a registered user name, a voiceprint of an administrator's voice indicating an approval phrase, and a voiceprint of a registered administrator's voice indicating a registered approval phrase are used. In this way, limiting a voiceprint used in sound authentication to a corresponding word, the calculation load of the processing concerning sound authentication can be reduced. The reduction in calculation load contributes to an improvement in authentication speed and a reduction in power consumption. The improvement in authentication speed can reduce the stress of a user during use of the device, and can reduce the possibility that the user makes a mistake in the timing of information acquisition. Furthermore, user authentication is performed every time authenticated data is generated, and the information acquisition device 100 is a mobile information device, and thus the reduction in power consumption is of service.

Second Embodiment

A second embodiment of the present invention is described. Here, differences from the first embodiment will be described, and for elements specified by the same reference signs, a duplicate description of such elements will be omitted. In the first embodiment, the information acquisition system 1 is described, which is capable of easily generating acquired data as authenticated data with high evidentiality, as long as the user is the user who has been approved in the initial authentication and user authentication. In the authentication using such sound authentication, the authentication accuracy may vary depending on the quality of sound to be sound-collected. For this reason, to improve the authentication accuracy, the control of sound collection properties allowing appropriate sound collection is in demand. In the present embodiment, an information acquisition system 1 that further performs control of the sound collection properties will be described.

<Outline>

Figure 9:
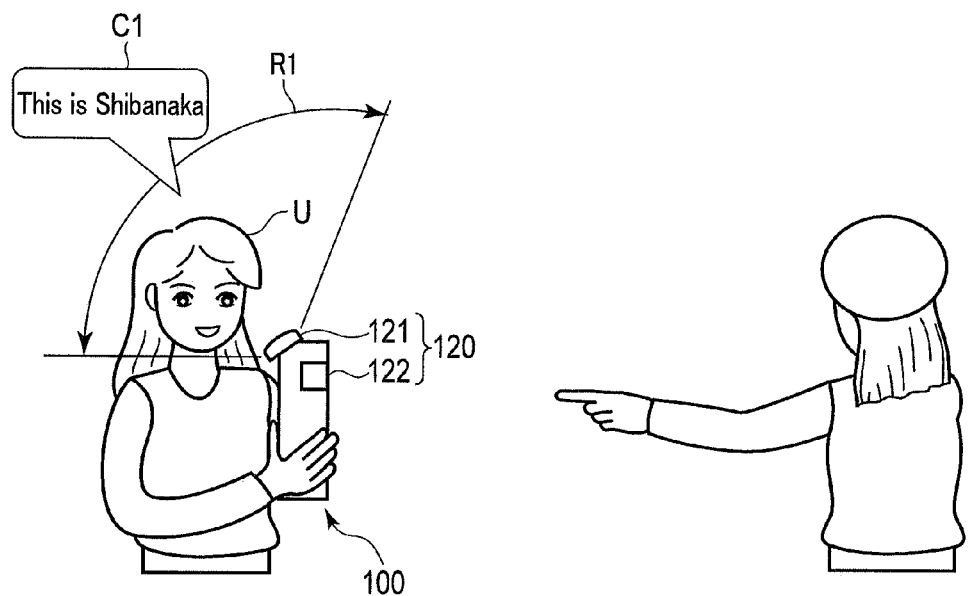
FIG. 9 is a schematic diagram for illustrating one example of initial authentication according to a second embodiment.
Figure 10:
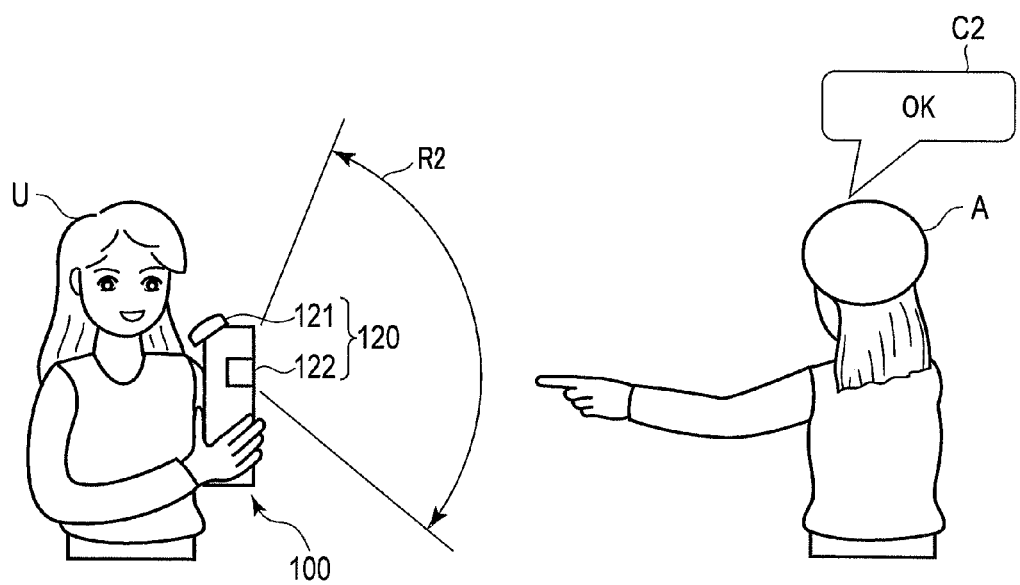
FIG. 10 is a schematic diagram for illustrating one example of the initial authentication according to the second embodiment.

A second embodiment of the present invention will be described with reference to the drawings. FIGS. 9 and 10 are each a schematic diagram for illustrating one example of initial authentication according to the present embodiment. FIG. 9 shows a state where in the initial authentication, an initial authentication user's voice C1 uttered by a user U is sound-collected. FIG. 10 shows a state where in the initial authentication, approver's voice C2 uttered by an administrator A is sound-collected.

In the present embodiment, a certain way of grasping the information acquisition device 100 is assumed. For example, the information acquisition device 100 has a housing which is shaped based on anthropometrics. For example, the shape and the arrangement of various components of a first operation unit 170 of the information acquisition device 100 may be determined based on anthropometrics. The user U can grasp the information acquisition device 100 in an easy-to-operate way. By providing such a shape and arrangement, it is possible to induce the user U to grasp the information acquisition device 100 in a predetermined device posture. For example, the information acquisition device 100 includes a posture sensor and acquires a device posture of the information acquisition device 100. Furthermore, in the information acquisition device 100, a sound connection direction (front direction) which is the user side of the information acquisition device 100 when grasped in an assumed device posture, and a sound collection direction (rear direction) which is a direction different from the front direction are preset.

For example, when the initial authentication user's voice C1 uttered by the user U is sound-collected, the sound collection properties are controlled so that the sound can be sound-collected with front directivity in which sound in the front direction (user side of the information acquisition device 100) is sound-collected in preference. FIG. 9 schematically shows a front-sound collection range R1 which is a sound collection range in the sound collection in the front direction. The sound-collected initial authentication user's voice C1 is acquired as a front-sound collection result (initial authentication audio data). Similarly, a user's voice (user authentication user's voice) in the user authentication is sound-collected with front directivity and is acquired as user authentication audio data. For example, when an approver's voice C2 uttered by an administrator A is sound-collected, the sound collection properties are controlled so that the voice (sound) can be sound-collected with rear directivity in which sound in the rear direction (administrator side of the information acquisition device) is sound-collected in preference. FIG. 10 schematically shows a rear-sound collection range R2 which is a sound collection range in the rear-sound collection. The sound-collected approver's voice C2 is acquired as a rear-sound collection result (initial authentication audio data).

In this way, in the information acquisition method according to the present embodiment, the initial authentication user's voice C1 and the user authentication user's voice are sound-collected in a state where different sound collection properties from that of the approver's voice C2 are respectively set up for these voices (sounds). The sound collection properties including the sound collection directivity are appropriately controlled, thereby making it possible to improve the sound quality of the authentication audio data. Therefore, if the information acquisition method according to the present embodiment is used, the accuracy of the initial authentication and the user authentication can be improved.

In the information acquisition method according to the present embodiment, if data acquired after the user authentication includes sound (voice), the sound (voice) is transcribed into characters and acquired as text data. The acquired text data (acquired data) is associated with related information and is generated as authenticated data. By performing appropriate control of sound collection properties, sound collection suitable for transcription of sound into characters is realized in the information acquisition after the user authentication.

<Configuration>

Figure 11:
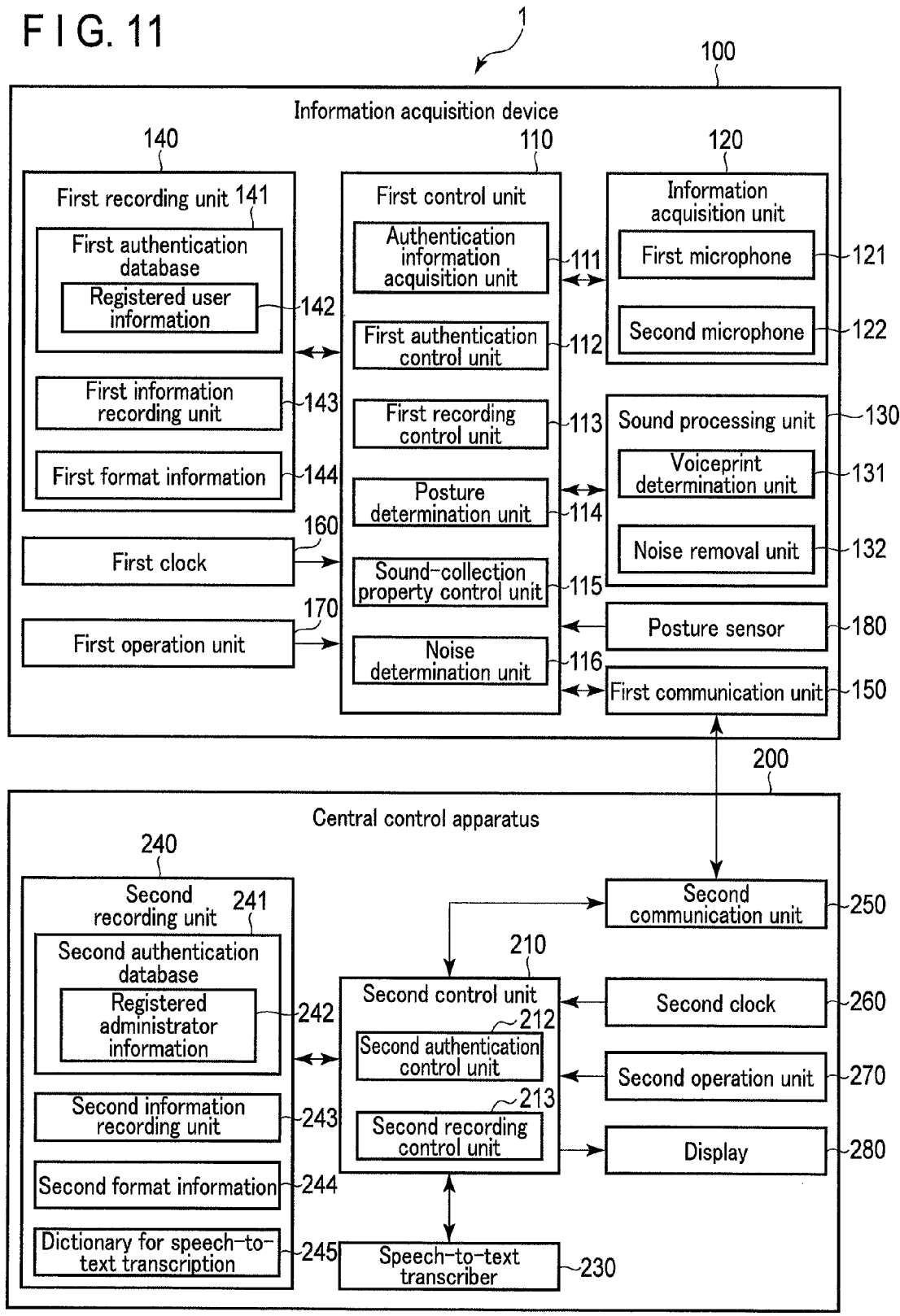
FIG. 11 is a block diagram showing the outline of a configuration example of an information acquisition system according to the second embodiment.

As shown in FIG. 11, the information acquisition device 100 further includes a posture sensor 180. The posture sensor 180 acquires information related to the device posture of the information acquisition device 100. The posture sensor 180 is, for example, a sensor, such as an acceleration sensor, a gyro sensor, an electronic compass, etc. If a predetermined device posture is set depending on the shape of a housing of the information acquisition device 100, and/or the shape or arrangement of the first operation unit 170, the posture sensor 180 may be a touch sensor which detects a contact condition between the information acquisition device 100 and the user.

The first control unit 110 according to the present embodiment further has functions as a posture determination unit 114, a sound-collection property control unit 115, and a noise determination unit 116. The posture determination unit 114 determines a device posture of the information acquisition device 100, based on output of the posture sensor 180. The posture determination unit 114 further determines whether or not the information acquisition device 100 is grasped in a predetermined device posture. The sound-collection property control unit 115 controls the sound collection properties of an information acquisition unit 120 according to the device posture determined by the posture determination unit 114. Correspondences between device postures and sound collection properties are preset and recorded, for example, in the first recording unit 140. The noise determination unit 116 determines presence or absence of noise of various types of audio data. If the noise size is equal to or lower than a predetermined value, it may be determined to be free of noise. For example, the noise determination unit 116 may acquire, from a sound processing unit 130, etc., information on whether or not the voice-print determination was enabled, and whether or not a user name, etc. was able to be extracted to determine presence or absence of noise based on these results.

The information acquisition unit 120 according to the present embodiment includes a first microphone 121 and a second microphone 122. The first microphone 121 is placed on the front side of the information acquisition device 100. The front side of the information acquisition device 100 is the side facing the user when the information acquisition device 100 is grasped by the user in an assumed way of holding. The first microphone 121 is configured to enable sound collection with a front directivity in which sounds in the front direction (on the user side of the information acquisition device 100) are collected in preference, when the information acquisition device 100 is grasped by the user in an assumed way of holding. The second microphone 122 is placed on the rear side of the information acquisition device 100. The rear side of the information acquisition device 100 is the side facing the administrator or a target when the information acquisition device 100 is grasped by the user in an assumed way of holding. It can be expressed that the second microphone 122 is placed on the rear side of the information acquisition device 100, which is the side opposed to the first microphone 121. The second microphone 122 is configured to enable sound collection with rear directivity in which sound in the rear direction (on the administrator side of the information acquisition device) is collected in preference, when the information acquisition device 100 is grasped by the user in an assumed way of holding.

The sound processing unit 130 according to the present embodiment further includes a noise removal unit 132. The noise removal unit 132 is, for example, a low-pass filter which removes high-frequency components. The noise removal unit 132 may be software that operates by a program or may be hardware.

The central control apparatus 200 according to the present embodiment further includes a speech-to-text transcriber 230. The speech-to-text transcriber 230 transcribes audio data into characters in reference to language models or acoustic data (acoustic models) recorded in the second recording unit 240. The speech-to-text transcriber 230 outputs a result of the transcribed characters as text data.

The second recording unit 240 according to the present embodiment further records second format information 244 and a dictionary for speech-to-text transcription 245. In the second format information 244, information on the data format of authenticated data, etc. using text data is recorded. The authenticated data generated in the present embodiment is generated based, for example, on an audio file (authenticated data) received from the information acquisition device 100 and text data generated at the central control apparatus 200, or is generated based, for example, on auxiliary data and text data. The dictionary for speech-to-text transcription 245 includes various types of information required for transcription of audio data into characters, such as language models, acoustic modes, etc.

<Operations>

Figure 12:
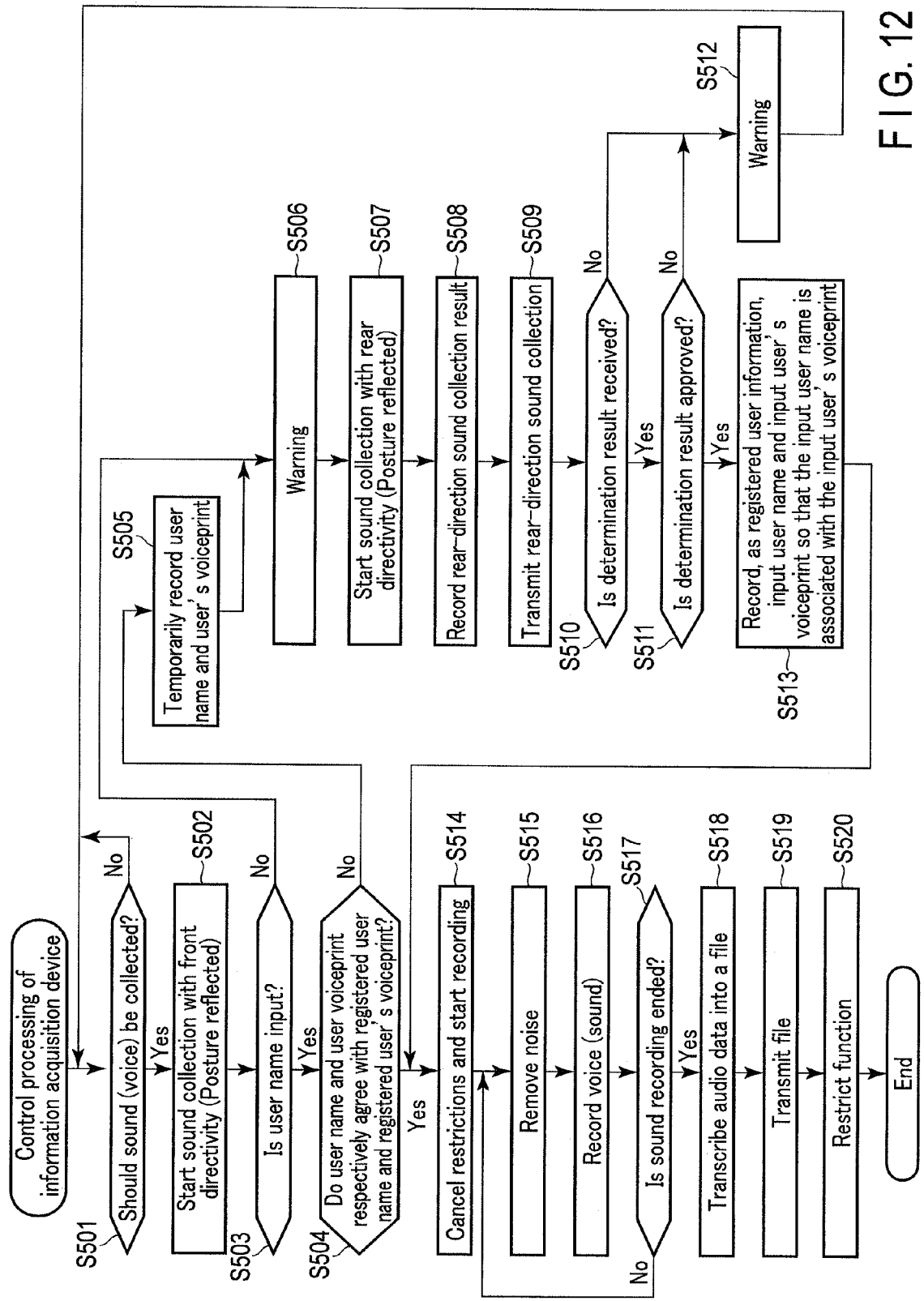
FIG. 12 is a flowchart showing one example of the control processing of an information acquisition device according to the second embodiment.

Here, one example of the control processing of the information acquisition device 100 according to the present embodiment is shown in FIG. 12 as a flowchart, and operations of an information acquisition system 1 will be described with reference to the flowchart. The control processing of the information acquisition system 1 in the present embodiment is described below while comparing it with the control processing of the information acquisition device 100 according to the first embodiment described in reference to FIGS. 4 and 7. The processing described below is started, for example, in a state where the information acquisition device 100 is grasped in an assumed way of holding.

In step S501, the first control unit 110 determines whether to start sound collection. The sound collection may be determined to be started, for example, when the initial authentication or the user authentication is selected, when a sound with a sound volume equal to or higher than a predetermined threshold is detected, or when it is determined that the information acquisition device 100 is in a predetermined device posture, etc. The processing is repeated until it is determined that the sound collection is started. When it is determined that the sound collection is started, the processing proceeds to step S502.

In step S502, the first control unit 110 cause the first microphone 121 to collect the user's voice to acquire authentication audio data in the same manner as step S104. That is, the first control unit 110 causes the first microphone 121 to collect sound with front directivity in which sound in the front direction (user side of the information acquisition device 100) are sound-collected in preference. The user's voice sound-collected here is an initial authentication user's voice or a user authentication user's voice. In step S503, the first control unit 110 determines whether or not sound input (of a user name) was present. In this determination, if no sound was input within a predetermined time period, the first control unit 110 determines that sound (of user name) was not input. Furthermore, the first control unit 110 acquires the user's voiceprint in the same manner as step S105. When it is determined that sound input was present, the processing proceeds to step S504, and when it is not determined as such, the processing proceeds to step S506. In step S504, the first control unit 110 determines whether or not the user information agrees with the registered user information 142, in the same manner as step S106 and step S107. When it is determined that the user information agrees with the registered user information 142, the processing proceeds to step S514, and when it is not determined as such, the processing proceeds to step S505.

In step S505, the first control unit 110 temporarily records, in a first recording unit 140, acquired user information including the user name and user's voiceprint. In step S506, the first control unit 110 gives the user a warning that the information acquisition function is in an unavailable state, and the user authentication is not approved, in the same manner as step S108. The first control unit 110 may give the user a warning that user authentication or initial authentication is needed instead of warning that the user authentication is not approved.

In step S507, the first control unit 110 cause the second microphone 122 to collect the administrator's voice (approver's voice) to acquire authentication audio data in the same manner as step S301. That is, the first control unit 110 causes the second microphone 122 to collect the administrator's voice with rear directivity in which sounds in the rear direction (Administrator side of the information acquisition device 100) are sound-collected in preference. In step S508, the first control unit 110 causes a first recording unit 140 to record the acquired authentication audio data as a rear-sound collection result. In step S509, the first control unit 110 transmits the rear-sound collection result to the central control apparatus 200 in the same manner as step S303. Note that the rear-sound collection result transmitted here may be administrator information including an administrator's voiceprint and an approval phrase.

In step S510, the first control unit 110 determines whether or not a determination result of the initial authentication processing is received from the central control apparatus 200. When it is determined that the determination result is received, the processing proceeds to step S511, and when it is not determined as such, the processing proceeds to step S512. In step S511, the first control unit 110 determines whether the determination result received in step S510 is an approval notice or a non-approval notice. When it is determined that the determination result is an approval notice, the processing proceeds to step S513, and when it is determined that the determination result is a non-approval notice, the processing proceeds to step S512. In step S512, the first control unit 110 gives the user a warning in the same manner as step S306. Thereafter, the processing returns to step S501. In step S513, the first control unit 110 performs user registration in the same manner as step S305.

In step S514, the first control unit 110 cancels restrictions related to the information acquisition function in the same manner as step S109. The first control unit 110 starts sound recording (acquisition of information). If the user intents to acquire his or her voice, the first control unit 110 causes the first microphone 121 to collect his or her voice (sound), and if the user intends to acquire voice (sound) of a sound collection target residing at a position facing the user, the first control unit 110 causes the second microphone 122 to collect the voice (sound). The determination on whether to perform the front-sound collection or the rear-sound collection may be made according to the sound intensity of the sound to be collected by the first microphone 121 or the second microphone 122, according to the preset priority, or in response to a result of the user operation. In step S515, the first control unit 110 subjects the collected voice (sound) to noise cancellation. In step S516, the first control unit 110 temporarily records, in the first recording unit 140, the collected voice (sound). In step S517, the first control unit 110 determines whether to end the sound recording (information acquisition) in the same manner as step S111. If it is determined that the sound recording is not ended, the processing returns to step S515. The processing of step S515 and step S517 is repeated until it is determined in step S515 that the information acquisition is ended. If it is determined that the audio recording is ended, the processing proceeds to step S518.

In step S518, the first control unit 110 generates a file of the acquired audio data and generates authenticated data in the same manner as step S112. In step S519, the first control unit 110 transmits the authenticated data to the central control apparatus 200 in the same manner as step S113. In step S520, the first control unit 110 restricts the information acquisition function provided in the information acquisition device 100 in the same manner as step S114. Thereafter, the processing ends.

Figure 13:
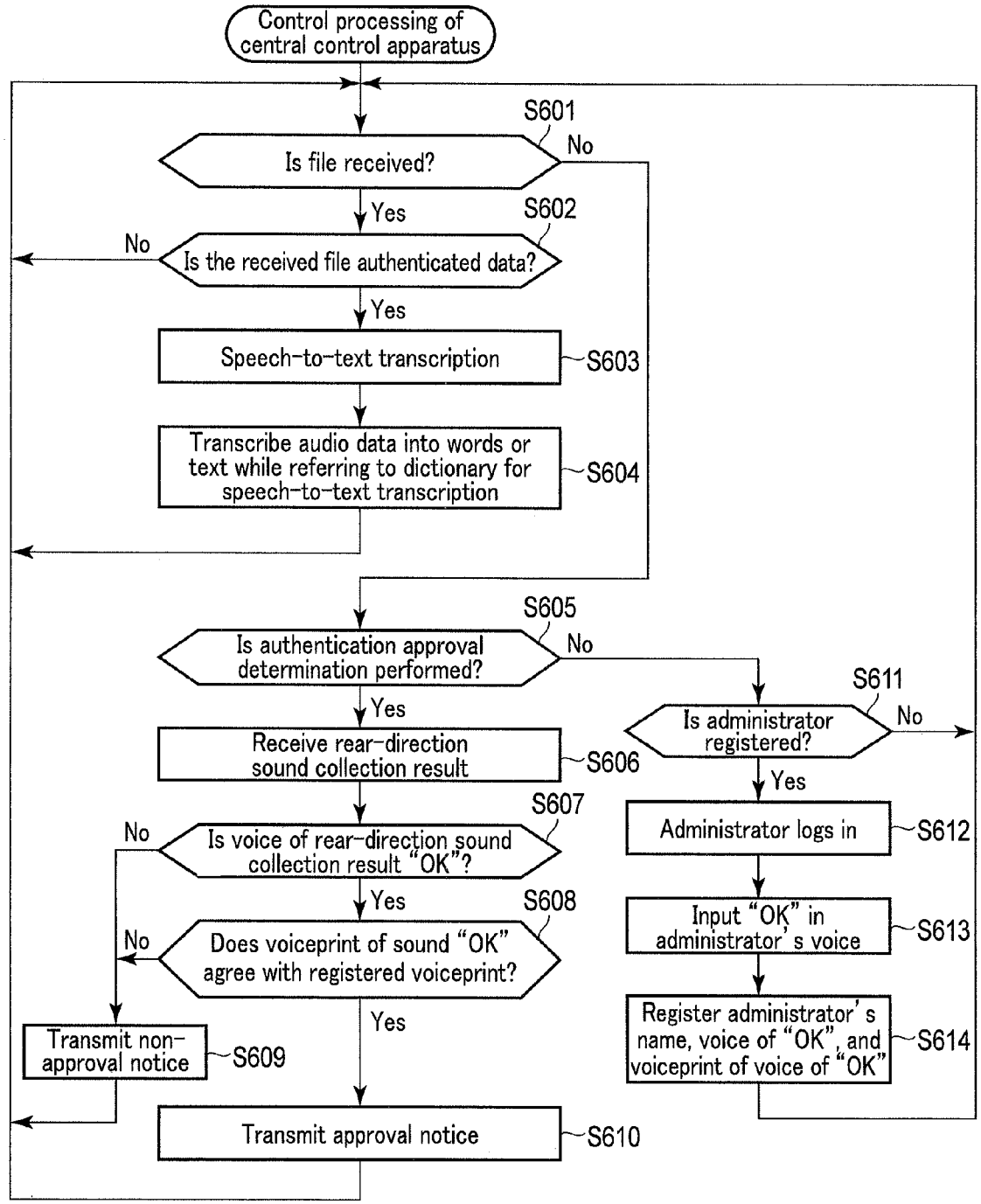
FIG. 13 is a flowchart showing one example of the control processing of a central control apparatus according to the second embodiment.

Here, one example of the control processing of the central control apparatus 200 according to the present embodiment is shown in FIG. 13 as a flowchart, and operations of an information acquisition system 1 will be described with reference to the flowchart. The control processing of the central control apparatus in the present embodiment is described below in comparison with the control processing of the central control apparatus 200 according to the first embodiment with reference to FIGS. 6 and 8.

In step S601, the second control unit 210 determines whether or not the file (acquired data) is received. When it is determined that the acquired data is received, the processing proceeds to step S602, and when it is not determined as such, the processing proceeds to step S605.

In step S602, the second control unit 210 determines whether or not the file received in step S601 is authenticated data. When it is determined that the file is authenticated data, the processing proceeds to step S603, and when it is not determined as such, the processing returns to step S601. In step S603, the second control unit 210 causes the speech-to-text transcriber 230 to transcribe the audio data included in the received file into characters. The speech-to-text transcriber 230 refers to an acoustic model included in the dictionary for speech-to-text transcription 245 to transcribe the audio data into characters or words. In step S604, the second control unit 210 causes the speech-to-text transcriber 230 refers to a language model included in the dictionary for speech-to-text transcription 245 to transcribe the text data that was obtained in step S603 into words or a sentence(s). The obtained words or sentence(s) are/is recorded in a second recording unit 240 as a text data. It should be noted that the acquired text data is included in authenticated data so that the acquired text data is associated with the received file or auxiliary data included in the received file. The authenticated data generated here is recorded in the second recording unit 240 and/or transmitted to the information acquisition device 100. The authenticated data using the acquired text data may be generated in the information acquisition device 100.

In step S605, the second control unit 210 determines whether to perform an authentication approval determination (initial authentication processing on the administrator).

In this determination, for example, when the rear-sound collection result transmitted from the information acquisition device 100 is received in step S509, it is determined that an authentication approval determination is executed. When it is determined that the initial authentication processing on the administrator is executed, the processing proceeds to step S606, and when it is not determined as such, the processing proceeds to step S611.

In step S606, the second control unit 210 acquires the rear-sound collection result (administrator information) from the information acquisition device 100 in the same manner as step S401. The processing in this step corresponds to the processing of step S509 in the control processing of the information acquisition device 100 according to the present embodiment. In step S607, the second control unit 210 determines whether or not the voice (sound) of the rear-sound collection result (administrator information) include "OK". Here, "OK" is one example of the approval phrase. In other words, in this determination, whether or not the approval phrase agrees with a registered approval phrase is determined. When it is determined that the approval phrase agrees with the registered approval phrase, the processing proceeds to step S608, and when it is not determined as such, the processing proceeds to step S609. In step S608, the second control unit 210 determines whether or not the voiceprint of the voice (sound) "OK" agrees with a registered administrator's voiceprint. Here, the voiceprint of the voice "OK" is the administrator's voiceprint included in the administrator information. When it is determined that the voiceprint of the voice (sound) "OK" agrees with the registered administrator's voiceprint, the processing proceeds to step S610, and when it is not determined as such, the processing proceeds to step S609. In step S609, the second control unit 210 generates (issues) a non-approval notice notifying that the initial authentication is not approved, and transmits the non-approval notice to the information acquisition device 100. In step S610, the second control unit 210 generates (issues) an approval notice and transmits the approval notice to the information acquisition device 100 in the same manner as step S405. The processing in step S609 and step S610 corresponds to the processing of step S510 in the control processing of the information acquisition device according to the present embodiment.

In step S611 to step S614, the second control unit 210 performs the administrator registration in the same manner as step S203 to step S206. The registered approval phrase registered in the administrator registration is, for example, "OK". It should be noted that a plurality of approval phrases may be registered.

The information acquisition system 1 according to the present embodiment further has the following effect in addition to the effect obtained by the information acquisition system 1 according to the first embodiment.

In the information acquisition device 100 according to the present embodiment, an assumed way of being grasped is defined based on the shape of the housing, and the shape or arrangement of a first operation unit 170, etc. From this definition, a positional relationship between the information acquisition device 100 and the user or the administrator can be assumed, and therefore, the information acquisition device 100 according to the present embodiment can acquire appropriate audio data. The information acquisition device 100 according to the present embodiment performs sound-collection property control to switch sound collection directions of the information acquisition device 100 between the front direction (user side of the information acquisition device 100) and the rear direction (administrator side of the information acquisition device 100). Such sound-collection property control may improve the accuracy of extracting user information or administrator information. That is, the information acquisition device 100 according to the present embodiment can generate authenticated data with higher evidentiality.

The information acquisition device 100 according to the present embodiment controls the switching of sound collection properties also in the time between the time of acquiring authenticated audio data and the time of acquiring information. Such sound collection control can realize acquisition of audio data suitable for sound authentication and acquisition of audio data suitable for recording. The audio data suitable for recording includes audio data suitable for speech recognition in the transcription of audio data into characters.

The central control apparatus 200 according to the present embodiment can transcribe audio data into characters and generate text data. For this reason, the user can acquire text data without having to listen to the voice once again, if the user acquires information using the information acquisition device 100 according to the present embodiment. By executing, by the central control apparatus 200, the processing of the transcription of audio data into characters which is large in calculation load and power consumption, it is also possible to reduce the power consumption of the information acquisition device 100 as a mobile device.

The generation of text data is executed for audio data included in authenticated data. For this reason, the user can easily acquire a report which clarifies who made the comment and when the comment was made, if the user acquires information using the information acquisition device 100 according to the present embodiment.

<Modification>

The second embodiment is described using, as an example, the case where the information acquisition device 100 includes two microphones; however, the embodiment is not limited thereto. In the information acquisition device 100, the sound collection direction may be controlled by subjecting sound-collected sounds to sound processing, or the information acquisition device 100 may include three or more microphones.

The second embodiment is described using, as an example, the case where audio data is transcribed into characters by the central control apparatus 200; however, the embodiment is not limited thereto. The sound processing unit 130 may have a function as a speech-to-text transcriber that transcribes audio data into characters to generate a text. With such a configuration, the information acquisition device 100 can singularly generate authenticated data including text data. In this case, the dictionary for speech-to-text transcription 245, and generated text data, etc., can be recorded in the first recording unit 140.

The second embodiment is described for the information acquisition system 1 that transcribes sound into characters; however, the embodiment is not limited thereto. The information acquisition system 1 may not include components related to the transcription of sound into characters. Even in such a case, the technique according to the second embodiment realizes more appropriate sound collection based on the techniques related to the assumed way of being grasped and the sound collection property control, thereby making it possible to improve the accuracy of audio authentication.

The second embodiment is described using, as an example, the case where the information acquisition device 100 includes a plurality of microphones; however, the embodiment is not limited thereto. A plurality of microphones may not be provided, and switching of the sound collection directions may not be performed. Even in such a case, the technique according to the second embodiment enables generation of authenticated data including text data.

In the initial authentication or the user authentication according to the second embodiment, whether or not the information acquisition device 100 is grasped in a predetermined device posture may be further determined. By configuring the information acquisition device 100 as such, it is possible to generate authenticated data for which it is clear whether or not the information is information recorded in a normal condition. Furthermore, when it is determined that the device posture is not the predetermined device posture, it may be determined that the information acquisition is ended.

The above-described embodiments and modification are described using, as an example, the case where the information acquisition device 100 singularly executes user authentication, and communications are made between the information acquisition device 100 and the central control apparatus 200 to thereby execute initial authentication; however, the embodiment is not limited thereto. For example, the initial authentication may be executed by the information acquisition device 100 alone. In this case, a voiceprint determination unit 131 provided in the information acquisition device 100 compares the administrator's voiceprint with a registered administrator's voiceprint in the initial authentication. The registered administrator information 242 may be recorded in a first authentication database 141, or may be acquired from a second authentication database 241 of the central control apparatus 200 via the communication in the initial authentication. With such a configuration, the information acquisition device 100 can singularly execute the initial authentication and the user authentication. For example, the user authentication may be executed by performing communications between the information acquisition device 100 and the central control apparatus 200. In this case, authentication audio data or user information acquired by the information acquisition device 100 is transmitted to the central control apparatus 200. The second authentication control unit 212 compares the user information with registered user information 142. The registered user information 142 is recorded in the second authentication database 241.

The above-described embodiments and modification are described using, as an example, the case where a user's voiceprint, a registered user's voiceprint, an administrator's voiceprint, and a registered administrator's voiceprint are respectively voiceprints of voices (sounds) corresponding to a user name, a registered user name, an approved phrase, and a registered approved phrase; however, the embodiments are not limited thereto. The user's voiceprint, registered user's voiceprint, administrator's voiceprint, and registered administrator's voiceprint may be voiceprints acquired from voices (sounds) when other phrase was uttered.

The information acquisition device 100 according to the above-described embodiments and modification may include, as a function related to information acquisition, a normal mode and authenticated mode. The information acquisition device 100 operates in a normal mode when the user is not approved in the user authentication or when user authentication is not performed. The information acquisition device 100 operates in an authenticated mode after the user authentication is approved. In this case, the information acquisition device 100 can be shared between a user who needs authenticated data and a user who is satisfied as long as ordinary information acquisition can be done. Furthermore, even if initial authentication or user authentication is not normally executed for any reason, it is possible to prevent the user from missing information he or she would like to acquire. In this way, when information acquisition in the normal mode and information acquisition in the authenticated mode is performed, acquired data which is acquired in the normal mode and the authenticated data is separately recorded.

The information acquisition device 100 according to the above-described embodiments and modification may be configured to further include a position sensor such as a GPS sensor so as to acquire the location where information acquisition after user authentication is performed. In this case, the information on the location of the information acquisition may be used in preparation of authenticated data, etc. In the initial authentication or user authentication, whether or not the information acquisition device 100 is present at a predetermined location may be further determined. By configuring the information acquisition device 100 as such, it is possible not only to provide an area where information acquisition is prohibited, but also to generate authenticated data for which it is clear whether or not the information is information recorded in a normal condition. Furthermore, when it is determined that the information acquisition device 100 is not present at the predetermined location, it may be determined that the information acquisition is ended.

The above-described embodiments and modification are described using, as an example, the case where the administrator's voice (sound) is acquired after acquisition of a user's voice (sound); however, the embodiments are not limited thereto. For example, the initial authentication may be performed in the order in which after the administrator utters "It is registered", a user utters "This is Shibanaka" That is, it is sufficient that the initial authentication audio data includes a user name of the user's voiceprint, and an approval phrase (registered approval phrase) of the administrator's voiceprint (registered administrator's voiceprint).

(Modification Related to Prevention of Spoofing)

In the above-described embodiments and modification, if a voice or sound of a registered approval phrase uttered by a registered administrator in initial authentication for other user was recorded in the past, there is a possibility that initial authentication is established by replaying the recorded administrator's voice (sound). So, the information acquisition method may include a method of preventing spoofing. The following modification is described using, as an example, the case where a user name the user would like to register is "Shibanaka", and a registered approval phrase is "OK". In the initial authentication according to the present modification, whether or not a keyword is included, in addition to the registered approval phrase, in the administrator's voice (sound) (initial authentication audio data), is further determined (the third determination).

The keyword may be a user name uttered by the user in the initial authentication. For example, if the registered administrator would like to approve a user who has uttered "This is Shibanaka" the registered administrator utters "Ms. Shibanaka, OK".

The keyword may be a phrase generated in the information acquisition system 1. For example, the information acquisition device 100 further includes a keyword presentation unit which generates a keyword corresponding to a registered approval phrase and presents the generated keyword to the administrator. The keyword may be generated at the central control apparatus 200. Supposing that the keyword is a word, "keyword", if the registered administrator would like to approve a user who has uttered "This is Shibanaka", the registered administrator utters "Keyword, OK."

The keyword may be a word, or a randomly generated character string, or may include numbers. If the information acquisition device 100 is an imaging device, the keyword may be a phrase related to a characteristic thing within an imaging range. The phrase related to a characteristic thing is, for example, a phrase indicating the shape or color of the characteristic thing. In this case, the information acquisition device 100 includes an imaging unit which takes a picture and acquires an image in initial authentication, and an image processing circuit which analyzes the image. The information acquisition device 100 determines whether or not it was possible to extract a characteristic thing indicated by the keyword included in the administrator's voice (sound) from the image. The information acquisition device 100 determines to approve the initial authentication when it is determined that it was possible to extract the characteristic thing. If the information acquisition device 100 is an observation device or a measurement device, the keyword may be a phrase related to an observation result or a measurement result. The phrase related to the observation result or measurement result may be a phrase indicating the shape of a petri dish, or a measurement value such as a temperature measured at that time.

The keyword may be presented with an image or may be presented by means of a voice (sound), or may be presented by vibrations. Furthermore, the keyword may be presented by the information acquisition device 100 or may be presented by the central control apparatus 200. For this reason, the information acquisition device 100 or the central control apparatus 200 may include, as a keyword presentation device, a display, a speaker, a vibrator, etc.

In this way, the information acquisition method according to the present modification determines whether or not a keyword is included, in addition to a registered approval phrase, in an administrator's voice (sound) (authentication audio data). Since the information acquisition method can prevent unauthorized use of sound of a registered administrator's voice that was recorded in the past, it is possible to generate authenticated data with high evidentiality. The order of utterance of a keyword and utterance of a registered approval phrase is not limited to the order described above. The administrator's voice (sound) may be "OK. Keyword." etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

In the embodiments, a part named as a section or a unit may be structured by a dedicated circuit or a combination of a plurality of general purpose circuits, and may be structured by a combination of a microcomputer operable in accordance with a pre-programmed software, a processor such as a CPU, or a sequencer such as an FPGA. In addition, a design where a part of or total control is performed by an external device can be adopted. In this case, a communication circuit is connected by wiring or wirelessly. Communication may be performed by means of Bluetooth, Wi-Fi, a telephone line, or a USB. A dedicated circuit, a general purpose circuit, or a controller may be integrally structured as an ASIC. A specific mechanical functionality (that can be substituted by a robot when a user images while moving) may be structured by various actuators and mobile concatenating mechanisms depending on the need, and may be structured by an actuator operable by a driver circuit. The driver circuit is controlled by a microcomputer or an ASIC in accordance with a specific program. The control may be corrected or adjusted in detail in accordance with information output by various sensors or peripheral circuits.

What is claimed is:

1. An information acquisition device comprising:
a first control circuitry configured to:
acquire authentication audio data from a user in a state where functions related to information acquisition are restricted;
acquire user information including a user's voiceprint, which is a voiceprint of the user, and a voice representing a user name, from the authentication audio data through sound processing;
execute a user authentication to cancel the restrictions on the information acquisition when the user's voiceprint agrees with a registered user's voiceprint which is a voiceprint of a preliminarily registered user, and the user name agrees with a registered user name indicated by the registered user's voiceprint;
perform the information acquisition after the user authentication is executed;
generate an authenticated data so that the information acquired by the information acquisition is associated with the user name;
acquire authentication audio data from an administrator;
acquire, through sound processing, administrator information including an administrator's voiceprint, which is a voiceprint of the administrator, and a voice representing an approval phrase, from the authentication audio data acquired from the administrator;
transmit the administrator information to an external device, and
execute, in response to receiving an approval notice from the external device, initial authentication to determine that user registration is performed, wherein the user registration is performed by registering the user information as registered user information, and wherein the approval notice is issued when the administrator's voiceprint agrees with a registered administrators voiceprint which is a voiceprint of a preliminarily registered administrator and when the approval phrase agrees with a registered approval phrase indicated by the registered administrators voiceprint.

2. The information acquisition device according to claim 1, further comprising:
a first recording circuit in which a first authentication database is recorded, the first authentication database including t registered user information which includes the registered user's voiceprint and the registered user name.

3. The information acquisition device according to claim 1, wherein:
the external device includes a second recording circuit in which a second authentication database is recorded, the second authentication database including the registered user information which includes the registered user's voiceprint and the registered user name.

4. The information acquisition device according to claim 1, further comprising:
a first microphone placed on a front side of the information acquisition device facing the user of the information acquisition device when the information acquisition device is grasped by the user in a predetermined posture; and a second microphone placed on a rear side of the information acquisition device being opposed to the first microphone, wherein the first control circuitry is configured to cause the first microphone to collect sound when the authentication audio data is acquired, and to cause the second microphone to collect sound when target audio data is acquired in the information acquisition.

5. The information acquisition device according to claim 1, further comprising:

a first microphone placed on a front side of the information acquisition device facing the user of the information acquisition device when the information acquisition device is grasped by the user in a predetermined posture; and a second microphone placed on a rear side of the information acquisition device being opposed to the first microphone, wherein the first control circuitry is configured to cause the first microphone to collect sound when the authentication audio data which includes voice of the user, is acquired in the user authentication or the initial authentication, and to cause the second microphone to collect sound when the authentication audio data which includes voice of the administrator is acquired in the initial authentication.

6. The information acquisition device according to claim 1, wherein the first control circuitry is configured to further associate, in the generation of the authenticated data, approver information indicating the administrator, who has approved the user registration in the initial authentication, with the acquired information.

7. The information acquisition device according to claim 1, wherein the first control circuitry is configured to execute the initial authentication for the user when the user authentication is not approved.

8. An information acquisition system, comprising:
the information acquisition device according to claim 1, and
a central control apparatus comprising:
a second recording circuit in which a second authentication database is recorded, the second authentication database including the registered administrator's voiceprint and the registered approval phrase; and
a second control circuitry configured to issue the approval notice when the administrator's voiceprint agrees with the registered administrator's voiceprint, and the approval phrase agrees with the registered approval phrase.

9. The information acquisition system according to claim 8, wherein the second control circuitry is configured to further determine whether or not the user name indicated by the administrator's voiceprint is included in the authentication audio data, in addition to the registered approval phrase.

10. The information acquisition system according to claim 8,
wherein the first control circuitry is configured to generate a keyword corresponding to the registered approval phrase,
wherein the information acquisition device further comprises a keyword presentation device configured to present, in the initial authentication, the keyword to the administrator, and wherein the second control circuitry is configured to further determine whether or not the keyword indicated by the administrator's voiceprint is included in the authentication audio data, in addition to the registered approval phrase.

11. The information acquisition system according to claim 8,
wherein the second control circuitry is configured to transcribe audio data into characters to generate text data, and
wherein the first control circuitry is configured to acquire, as the acquired information, the text data based on audio data acquired after the user authentication is approved.

12. An information acquisition method comprising:
executing user authentication in a state where information acquisition is restricted;
the user authentication includes:
acquiring authentication audio data from a user,
acquiring user information including a users voiceprint which is a voiceprint of a user, and a user name indicated by the users voiceprint, from the authentication audio data,
acquiring registered user information including a registered user's voiceprint which is a voiceprint of a preliminarily registered user, and a registered user name indicated by the registered user's voiceprint,
making a first determination to determine whether or not the user's voiceprint agrees with the registered user's voiceprint, and the user name agrees with the registered user name, and
cancelling restrictions on a function related to the information acquisition when it is determined in the first determination that the user information agrees with the registered user information,
performing the information acquisition after the user authentication is approved;
generating authenticated data so that information acquired in the information acquisition is associated with the user name; and
executing initial authentication which includes:
acquiring authentication audio data from an administrator,
acquiring, through sound processing, administrator information including an administrator's voiceprint which is a voiceprint of an administrator and a voice representing an approval phrase from the authentication audio data acquired from the administrator,
transmitting the administrator information to the external device, and
authorizing, in response to receiving an approval notice from the external device, to perform user registration, wherein the user registration is performed by registering the user information as registered user information, and wherein the approval notice is issued when the administrator's voiceprint agrees with a registered administrator's voiceprint which is a voiceprint of a preliminarily registered administrator and when the approval phrase agrees with a registered approval phrase indicated by the registered administrator's voiceprint.

13. The information acquisition method according to claim 12, wherein executing initial authentication further includes:
acquiring registered administrator information including the registered administrator's voiceprint and a registered approval phrase indicated by the registered administrator's voiceprint, and making a second determination to determine whether or not the administrator's voiceprint agrees with the registered administrator's voiceprint, and the approval phrase agrees with the registered approval phrase.

14. The information acquisition method according to claim 13, wherein the generating authenticated data comprises further associating approver information indicating the administrator who has approved the user registration in the initial authentication, with the information.

15. The information acquisition method according to claim 13, wherein the initial authentication for the user is executed when the user authentication is not approved.

16. The information acquisition method according to claim 13, wherein the initial authentication further comprises:

making a third determination on whether or not the user name indicated by the administrator's voiceprint is included in the authentication audio data, in addition to the registered approval phrase.

17. The information acquisition method according to claim 13, wherein the initial authentication further comprises:

generating a keyword corresponding to the registered approval phrase, presenting the keyword to the administrator, and making a third determination to determine whether or not the keyword indicated by the administrator's voiceprint is included in the authentication audio data, in addition to the registered approval phrase.

18. The information acquisition method according to claim 13, wherein the information acquisition further comprises:

transcribing the authentication audio data into characters to generate text data, wherein the information acquired in the information acquisition to be associated with the registered user name is the text data.

* * * * *